US009294463B2

(12) United States Patent
Kim et al.

(10) Patent No.: US 9,294,463 B2
(45) Date of Patent: Mar. 22, 2016

(54) APPARATUS, METHOD AND SYSTEM FOR CONTEXT-AWARE SECURITY CONTROL IN CLOUD ENVIRONMENT

(71) Applicant: ELECTRONICS AND TELECOMMUNICATIONS RESEARCH INSTITUTE, Daejeon (KR)

(72) Inventors: Sung-Jin Kim, Daejeon (KR); ChulWoo Lee, Daejeon (KR); ByungJoon Kim, Daejeon (KR); HyoungChun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/466,971

(22) Filed: Aug. 23, 2014

(65) Prior Publication Data

US 2015/0237027 A1     Aug. 20, 2015

(30) Foreign Application Priority Data

Feb. 20, 2014   (KR) .......................... 10-2014-0019822

(51) Int. Cl.
*H04L 29/06*      (2006.01)
(52) U.S. Cl.
CPC .............. *H04L 63/08* (2013.01); *H04L 63/205* (2013.01)
(58) Field of Classification Search
CPC .............................. H04L 63/08; H04L 63/205
See application file for complete search history.

(56) References Cited

U.S. PATENT DOCUMENTS

| 2006/0274672 | A1* | 12/2006 | Venkitaraman | H04L 43/0811 370/254 |
| 2009/0183252 | A1* | 7/2009 | Nomi | H04L 63/08 726/13 |
| 2011/0271007 | A1* | 11/2011 | Wang | H04L 45/306 709/238 |
| 2012/0331088 | A1* | 12/2012 | O'Hare | G06F 21/6227 709/214 |
| 2013/0174239 | A1 | 7/2013 | Kim et al. | |
| 2014/0189808 | A1* | 7/2014 | Mahaffey | H04L 63/0853 726/4 |
| 2014/0237544 | A1* | 8/2014 | Higuchi | H04L 63/0884 726/3 |

FOREIGN PATENT DOCUMENTS

KR   10-2012-0038859 A    4/2012
KR   10-2013-0094359 A    8/2013

OTHER PUBLICATIONS

Yan Zhu et al., "Enabling Secure Location-based Services in Mobile Cloud Computing," Proceedings of the second ACM SIGCOMM workshop on Mobile cloud computing, Aug. 2013, pp. 27-32.

* cited by examiner

Primary Examiner — Mohammad A Siddiqi
(74) Attorney, Agent, or Firm — LRK Patent Law Firm

(57) ABSTRACT

An apparatus, method and system for context-aware security control in a cloud environment are provided. The apparatus includes an authentication header inspection unit and a packet data processing unit. The authentication header inspection unit generates an authentication header based on the received context information and key of a user, compares the generated authentication header with the authentication header of packet data received from a remote user terminal, and outputs the results of the comparison. The packet data processing unit performs one of the transmission, modulation and discarding of packet data from the cloud server of a cloud service network based on the results of the comparison by the authentication header inspection unit.

13 Claims, 4 Drawing Sheets

APPARATUS, METHOD AND SYSTEM FOR CONTEXT-AWARE SECURITY CONTROL IN CLOUD ENVIRONMENT

CROSS-REFERENCE TO RELATED APPLICATION

This application claims the benefit of Korean Patent Application No. 10-2014-0019822, filed Feb. 20, 2014, which is hereby incorporated by reference herein in its entirety.

BACKGROUND OF THE INVENTION

1. Technical Field

The present disclosure relates generally to an apparatus, method and system for context-aware security control in a cloud environment and, more particularly, to an apparatus, method and system for controlling data transmission between a user and a cloud based on context information in network Open Systems Interconnection (OSI) layers 3 and 4 in connection with a cloud virtual desktop or cloud storage service.

2. Description of the Related Art

Context-aware security technology refers to technology for performing security functionality, such as the control of data transmission, based on context information, such as the location and device of a user and time.

A cloud service enables a remote user terminal to access and use a cloud server over a network. For this purpose, a cloud virtual desktop service provides virtual desktop interworking protocols, such as PC over IP (PCoIP), Independent Computing Architecture (ICA), the Simple Protocol for Independent Computing Environments (SPICE), etc., and a cloud storage service provides data transmission protocols, such as Hyper Text Transfer Protocol (HTTP), Web Distribute Authoring and Versioning (WebDAV), etc., thereby supporting data transmission between a cloud service and a remote user terminal.

The data transmission control of a conventional cloud service is performed using a method of simply blocking an access Internet Protocol (IP) address or a method of deactivating a data transmission function in a cloud server or a user terminal. However, this conventional cloud service is disadvantageous in that it is difficult to apply fine-grained security policies, as in the case where a service is controlled based on context information, such as a user location, device information, and time.

As a related technology, Korean Patent Application Publication No. 10-2013-0094359 entitled "System and Method for Enhancing Authentication using Mobile Cloud Access Contextual Information" discloses a method of enhancing user authentication based on context information in a cloud service.

The invention disclosed in Korean Patent Application Publication No. 10-2013-0094359 has the advantage of diversifying authentication means or providing various access network security levels based on context information. However, since a user terminal and an authentication server perform user authentication while directly communicating with each other, an opportunity for attacking a weak point of an authentication server may be provided to a malicious attacker.

Another related technology is disclosed in the paper entitled "Enabling Secure Location-base Services in Mobile Cloud Computing," Proceedings of the second ACM SIGCOMM workshop on Mobile cloud computing, Yan Zhu, et al., Aug. 12, 2013.

SUMMARY OF THE INVENTION

Accordingly, the present invention is intended to provide an apparatus, method and system for context-aware security control in a cloud environment, which enable a user to control data transmission between a remote user terminal and a cloud service based on various types of context information, such as a user location, a user terminal and time, with respect to data that is transmitted between the inside and outside of a cloud service.

In accordance with an aspect of the present invention, there is provided an apparatus for context-aware security control in a cloud environment, including an authentication header inspection unit configured to generate an authentication header based on the received context information and key of a user, to compare the generated authentication header with the authentication header of packet data received from a remote user terminal, and to output the results of the comparison; and a packet data processing unit configured to perform one of the transmission, modulation and discarding of packet data from the cloud server of a cloud service network based on the results of the comparison by the authentication header inspection unit.

The authentication header inspection unit may restore the authentication header of the packet data received from the remote user terminal by parsing a data reception request transmitted by the remote user terminal, and may inspect the validity of the restored authentication header based on the generated authentication header.

The generated authentication header and the authentication header of the packet data received from the remote user terminal may be generated using a hash-based message authentication code (HMAC) function.

The packet data processing unit may perform transmission among transmission, modulation and discarding of the packet data, and the packet data processing unit may transmit the original packet data received from the cloud server to the remote user terminal without change.

The packet data processing unit may perform modulation among transmission, modulation and discarding of the packet data, and the packet data processing unit may modulate the packet data received from the cloud server and then transmit the modulated packet data to the remote user terminal.

The packet data processing unit may perform discarding among transmission, modulation and discarding of the packet data, and the packet data processing unit may block the packet data received from the cloud server, thereby terminating a session between the remote user terminal and the cloud server.

The apparatus may further include a policy input interface unit configured to provide an interface through which the type of context information and the packet data processing policies of the packet data processing unit are input.

The apparatus for context-aware security control, including the authentication header inspection unit and the packet data processing unit, may be installed at the entrance of the cloud service network in in-line mode.

The context information of the user may include location information; and the location information may be provided in such a way that a single unique value is mapped to a specific Global Positioning System (GPS) range block.

In accordance with another aspect of the present invention, there is provided a method for context-aware security control in a cloud environment, including generating, by an authentication header inspection unit, an authentication header based on the received context information and key of a user; comparing, by the authentication header inspection unit, the generated authentication header with an authentication header of packet data received from a remote user terminal, and outputting, by the authentication header inspection unit, the results of the comparison; and performing, by a packet data processing unit, one of the transmission, modulation and discarding of packet data received from the cloud server of a cloud service network based on the results of the comparison by the authentication header inspection unit.

Outputting the results of the comparison may include restoring the authentication header of the packet data received from the remote user terminal by parsing a data reception request transmitted by the remote user terminal; and inspecting validity of the restored authentication header based on the generated authentication header.

The generated authentication header and the authentication header of the packet data received from the remote user terminal may be generated using a hash-based message authentication code (HMAC) function.

Performing one of transmission, modulation and discarding may include, when the transmission is performed, transmitting the original packet data received from the cloud server to the remote user terminal without change.

Performing one of transmission, modulation and discarding may include, when the modulation is performed, modulating the packet data received from the cloud server and then transmitting the modulated packet data to the remote user terminal.

Performing one of transmission, modulation and discarding may include, when the discarding is performed, blocking the packet data received from the cloud server, thereby terminating a session between the remote user terminal and the cloud server.

The context information of the user may include location information; and the location information may be provided in such a way that a single unique value is mapped to a specific Global Positioning System (GPS) range block.

In accordance with still another aspect of the present invention, there is provided a system for context-aware security control in a cloud environment, including a context information provision terminal configured to output context information including GPS value-based location information and a key; a remote user terminal configured to generate an authentication header based on context information and a key received from the context information provision terminal, and to output a data reception request, along with the authentication header; and a context-aware security controller configured to receive the data reception request from the remote user terminal, and to control data transmission to the remote user terminal according to context-aware policies defined between the remote user terminal and a cloud server of a cloud service network.

The remote user terminal may include an authentication header generation unit configured to generate the authentication header based on the context information and the key; and a receiver agent unit configured to receive the context information and the key from the context information provision terminal and transfer the context information and the key to the authentication header generation unit, and to transmit the data reception request, together with the generated authentication header, to the context-aware security controller.

The context-aware security controller may include an authentication header inspection unit configured to generate an authentication header based on context information of a user and a key of the user received from a system administrator, to compare the generated authentication header with an authentication header of packet data received from the remote user terminal result, and to output results of the comparison; and a packet data processing unit configured to perform one of transmission, modulation and discarding of packet data received from the cloud server based on results of the comparison by the authentication header inspection unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
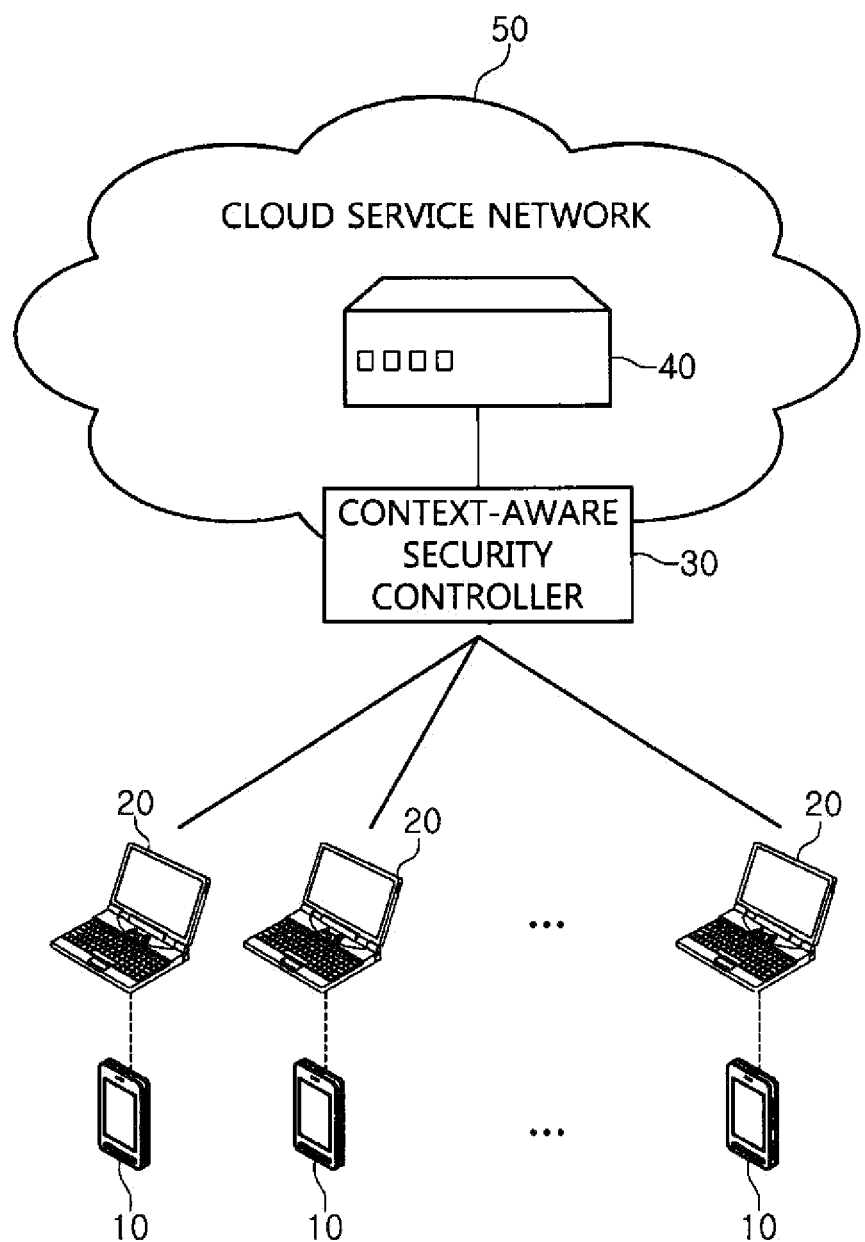
FIG. 1 is a diagram illustrating the application of an apparatus for context-aware security control in a cloud environment according to an embodiment of the present invention to a cloud service network.

The present invention may be subjected to various modifications, and may have various embodiments. Specific embodiments are illustrated in diagrams and described in detail.

However, this is not intended to limit the present invention to the specific embodiments, but it should be appreciated that all modifications, equivalents and replacements included in the spirit and technical range of the present invention fall within the range of the present invention.

The terms used herein are used merely to illustrate specific embodiments, and are not intended to limit the present invention. Unless otherwise stated clearly, a singular expression includes a plural expression. In the specification and claims, it should be understood that the term "comprise," "include," "have" and their variants are intended merely to designate the presence of features, numbers, steps, operations, elements, parts or combinations thereof described in the specification, and should not be construed as excluding the presence or additional probability of one or more different features, numbers, steps, operations, elements, parts or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention are described in detail below with reference to the accompanying drawings. In the following description of the embodiments, the same reference numerals are assigned to the same elements throughout the drawings and also redundant descriptions of the same elements are omitted, in order to make the overall understanding easy.

Figure 2:
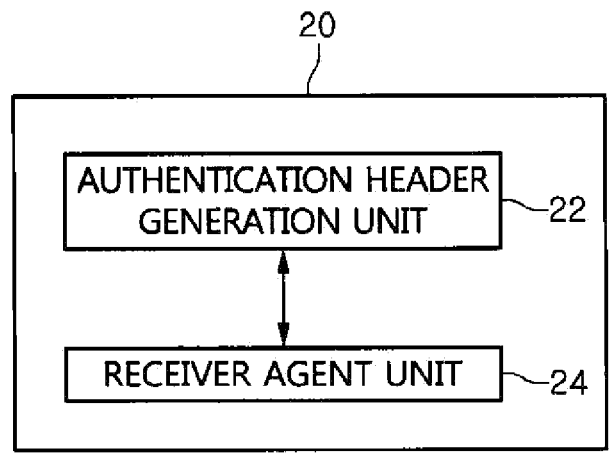
FIG. 2 is a diagram illustrating the internal configuration of the remote user terminal illustrated in FIG. 1.
Figure 3:
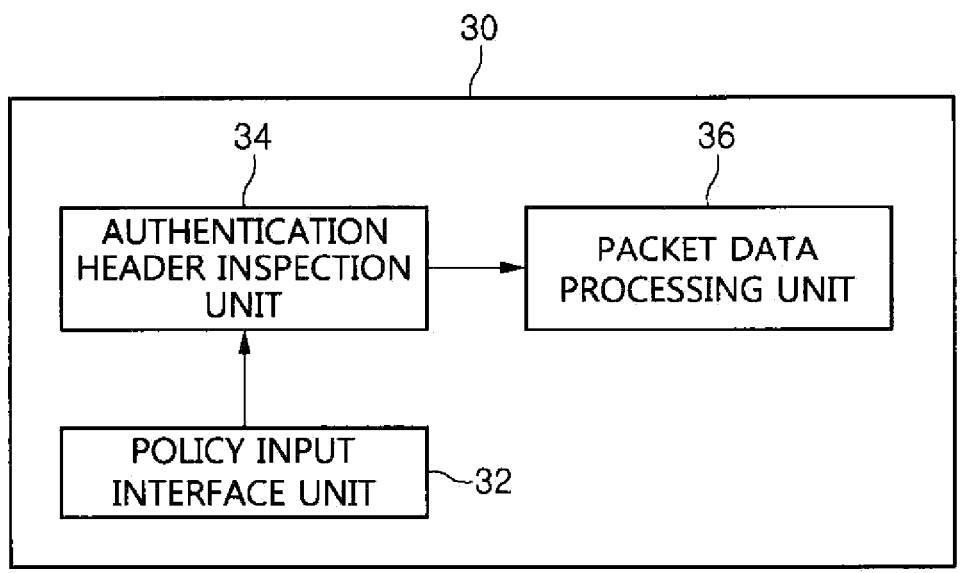
FIG. 3 is a diagram illustrating the internal configuration of the context-aware security controller illustrated in FIG. 1.
Figure 4:
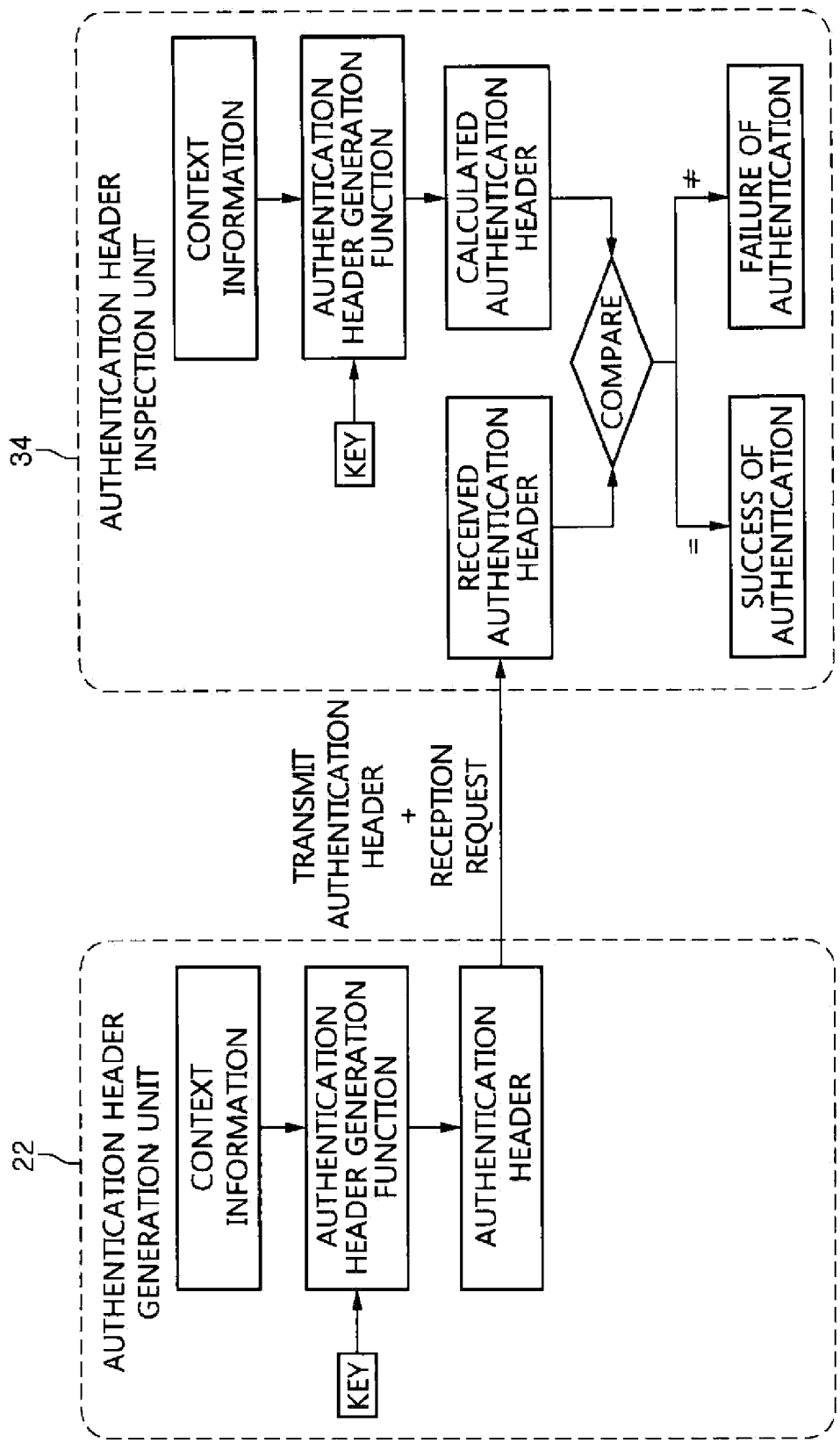
FIG. 4 is a diagram illustrating a procedure in which the remote user terminal and the context-aware security controller illustrated in FIG. 1 operate in cooperation with each other.

FIG. 1 is a diagram illustrating the application of an apparatus for context-aware security control in a cloud environment according to an embodiment of the present invention to a cloud service network; FIG. 2 is a diagram illustrating the internal configuration of the remote user terminal illustrated in FIG. 1; FIG. 3 is a diagram illustrating the internal configuration of the context-aware security controller illustrated in FIG. 1; and FIG. 4 is a diagram illustrating a procedure in which the remote user terminal and the context-aware security controller illustrated in FIG. 1 operate in cooperation with each other.

In FIG. 1, one or more context information provision terminals 10 communicate with a single remote user terminal 20, one or more remote user terminals 20 communicate with a single context-aware security controller 30, and a single context-aware security controller 30 is connected to the cloud server 40 of a cloud service network 50.

One of the context information provision terminals 10 provides a key and context information to a corresponding one of the remote user terminals 20 in response to a request from the remote user terminal 20. In other words, the context information provision terminal 10 may provide context information, such as GPS value-based location information and a unique terminal value, and a key to the remote user terminal 10. In an embodiment of the present invention, the context information provision terminal 10 may provide location information based on a location information mapping table in which specific GPS range blocks have been mapped to respective unique values.

The remote user terminal 20 may generate an authentication header, and may then transmit a data reception request, together with the authentication header, to the cloud server 40 via the context-aware security controller 30.

The remote user terminal 20 includes an authentication header generation unit 22 and a receiver agent unit 24, as illustrated in FIG. 2.

The authentication header generation unit 22 generates the authentication header based on the context information, such as the device information device, location information location and current time information of the corresponding remote user terminal 20, and the key. In this case, the context information and the key may be input by a system administrator or a user (for example, a person who has received the context information and the key from the system administrator). The context information and the key input by the system administrator or the user are applied to the authentication header generation unit 22 via the context information provision terminal 10.

The receiver agent unit 24 transfers the context information and the key received from the context information provision terminal 10 to the authentication header generation unit 22, and transmits the data reception request, together with the authentication header, to the cloud server 40. In other words, the receiver agent unit 24 may establish a session with the cloud server 40 in order to receive data from the cloud server 40, and may request and receive a key and context information required for the generation of a data authentication header from the context information provision terminal 10.

The context-aware security controller 30 may control cloud service transmission data based on various types of context information, and may be the principal agent of security control. That is, the context-aware security controller 30 may control data transmission according to context-aware policies defined between the cloud server 40 and the remote user terminal 20. Since the context-aware security controller 30 is installed in a cloud service entrance point network in in-line mode, the context-aware security controller 30 may independently perform the security control of transmission data without directly communicating with the remote user terminal 20 and the cloud server 40.

The context-aware security controller 30 includes a policy input interface unit 32, an authentication header inspection unit 34, and a packet data processing unit 36, as illustrated in FIG. 3.

The policy input interface unit 32 provides an interface through which a system administrator may input required context information and packet data processing policies. In other words, the policy input interface unit 32 provides an interface through which a system administrator may input the type of context information and packet data processing policies. For example, the policy input interface unit 32 may provide context information and a key required for the generation of the authentication header by the authentication header inspection unit 34. Furthermore, the policy input interface unit 32 may provide packet data processing policies required by the packet data processing unit 36.

The authentication header inspection unit 34 parses network traffic, and inspects an authentication header. In other words, the authentication header inspection unit 34 restores an authentication header by parsing a data reception request, transmitted by the receiver agent unit 24 of the remote user terminal 20, at the entrance of the cloud service network 50, inspects the validity of the restored authentication header, and transmits a data reception request to a destination, that is, the cloud server 40. That is, the authentication header inspection unit 34 receives the context information and key of the user that is input by a system administrator through the policy input interface unit 32, generates an authentication header, compares the generated authentication header with the authentication header of packet data from the remote user terminal 20, provides the results of the comparison to the packet data processing unit 36, and transmits a data reception request to the cloud server 40. In this case, the cooperative operation between the authentication header inspection unit 34 and the authentication header generation unit 22 may be schematically illustrated in FIG. 4. In FIG. 4, a key, context information and an authentication header generation function used by the authentication header inspection unit 34 as inputs need to be the same as those used by the authentication header generation unit 22. Furthermore, an example of the authentication header generation function may be a Hash-based Message Authentication Code (HMAC) function.

The packet data processing unit 36 performs the transmission, modulation or discarding of the packet data received from the cloud server 40 based on the results of the inspection by the authentication header inspection unit 34. In other words, the packet data processing unit 36 performs packet transmission/modulation/discarding based on the results of the inspection, and the cloud server 40 of the authentication header inspection unit 34 transmits the packet data of the receiver agent unit 24 to the remote user terminal 20 or terminates a session.

The context-aware security controller 30 configured as described above is located at a cloud service network entrance between the server agent of the cloud service (that is, a server agent (not illustrated) within the cloud server 40) and the receiver agent unit 24 of the remote user terminal 20 in in-line mode. The context-aware security controller 30 parses network traffic in Open Systems Interconnection (OSI) 3 and 4 layers, inspects the authentication header validity of a data reception request, and transmits original packet data transmitted by the cloud server 40 to the receiver agent unit 24 without change or transmits the original packet data after modulating it. Furthermore, the context-aware security controller 30 may discard packet data and thus prevent original packet data from being transmitted to the receiver agent unit 24 based on the inspection of the validity of the authentication header of a data reception request. As a result, the context-aware security controller 30 controls the movement of information of a cloud service, such as a virtual desktop or a cloud storage, on a transmission network based on context information, such as the identification information of the remote user terminal 20, the current location information of the user, and time information.

The above-described context-aware security controller 30 may be an example of an apparatus for context-aware security control in a cloud environment set forth in the claims of the present invention.

The cloud server 40 is a server that provides a cloud service in conjunction with the receiver agent unit 24 of the remote user terminal 20 and is located within the cloud service network 50. The cloud server 40 is an agent that provides a cloud service to the remote user terminal 20. The cloud server 40 may provide a virtual desktop service or a cloud storage service.

Figure 5:
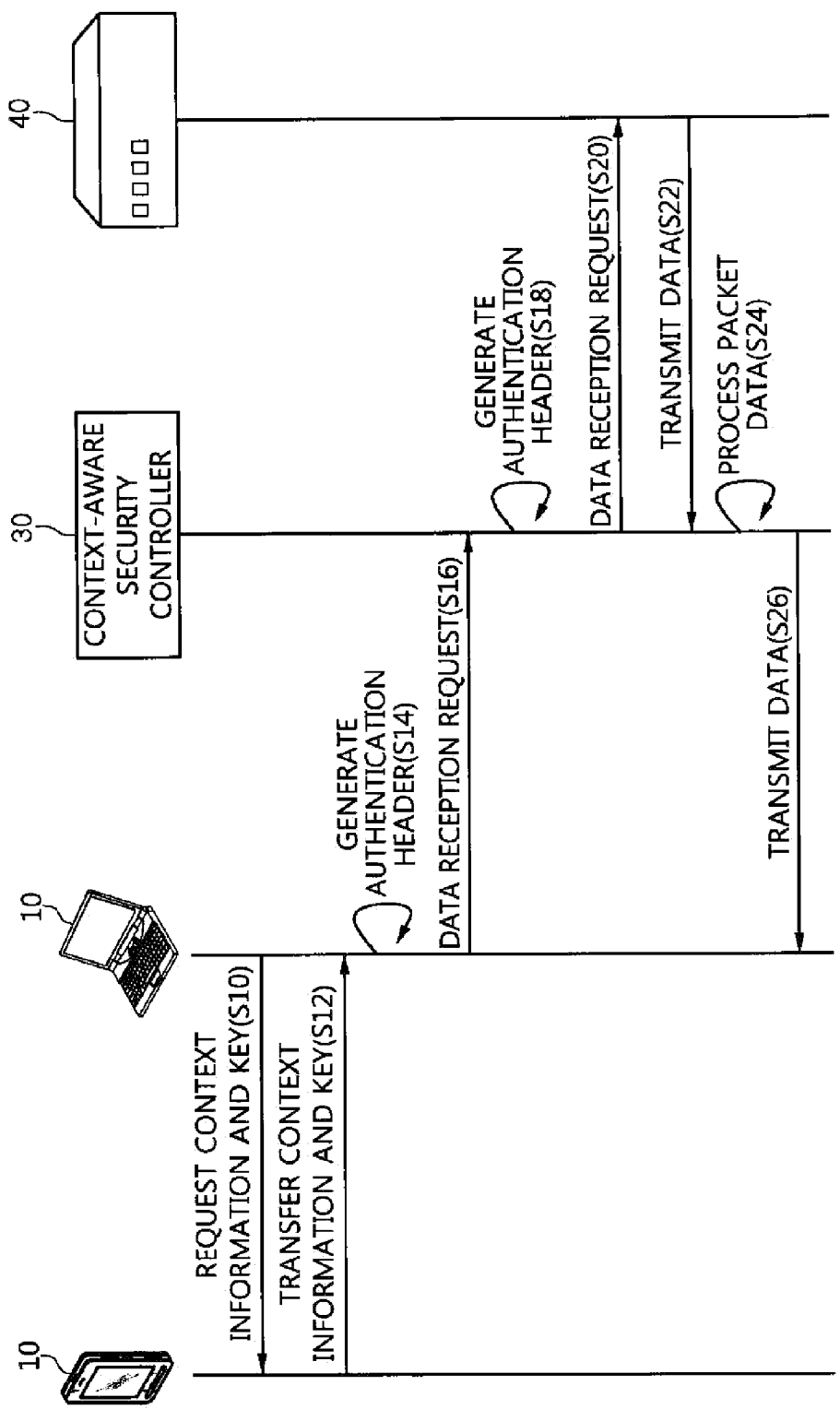
FIG. 5 is a flowchart illustrating a method of context-aware security control in a cloud environment according to an embodiment of the present invention.

FIG. 5 is a flowchart illustrating a method of context-aware security control in a cloud environment according to an embodiment of the present invention.

First, the receiver agent unit 24 establishes a session with the cloud server 40 in order to receive data from the cloud server 40 of the remote user terminal 20, and requests the key and context information required for the generation of a data authentication header from the context information provision terminal 10 at step S10.

Accordingly, the context information provision terminal 10 receives a request from the receiver agent unit 24 and transmits stored key and context information to the receiver agent unit 24 at step S12. In this case, examples of the context information may include location information, and the unique device value of the context information provision terminal 10. Meanwhile, the location information, which is one element of the context information, is replaced with a single value based on the location information mapping table. The location information mapping table includes a plurality of records in which GPS information including a specific range has been mapped to a single value. In other words, the location information mapping table may be implemented as the following Table 1:

TABLE 1

| GPS information | Mapping variable |
|---|---|
| ... | ... |
| [(126° 98', 37° 57'), (127° 14', 37° 45')] | 3911 |
| [(127° 14', 37° 45'), (127° 30', 37° 33')] | 3912 |
| ... | ... |

Each row of the location information of the mapping table includes two columns of GPS information and a mapping variable, and the GPS range is represented in the form of "[(start latitude, start longitude), (end latitude, end longitude)]" in order to represent a single location block. The mapping variable is a unique value representing a corresponding location block. In the location information mapping table, two or more identical mapping variables are not present. Meanwhile, the location information mapping table of Table 1 may be applied to the location information of context information received by the authentication header inspection unit 34 of the context-aware security controller 30 without change.

Thereafter, the receiver agent unit 24 of the remote user terminal 20 transfers the key and the context information, such as remote user terminal identification information, received from the context information provision terminal 10, to the authentication header generation unit 22. Accordingly, the authentication header generation unit 22 of the remote user terminal 20 generates an authentication header (AH) based on the key and the context information received from the receiver agent unit 24 at step S14. In this case, an example of a method of generating an authentication header may be a hash-based message authentication code (HMAC) method.

Thereafter, the receiver agent unit 24 of the remote user terminal 20 transmits the authentication header generated by the authentication header generation unit 22, together with a data reception request, to the context-aware security controller 30 at step S16.

Accordingly, the authentication header inspection unit 34 of the context-aware security controller 30 restores an authentication header by parsing the data reception request (including the authentication header) transmitted by the receiver agent unit 24 at the cloud service network entrance and inspects the validity of the restored authentication header at step S18. In this case, the inspection of the authentication header is performed using a method identical to the authentication header generation method of the receiver agent unit 24, and the authentication header inspection unit 34 is provided with context information and a key required for the generation of the authentication header via the policy input interface unit 32 in advance.

Once the inspection of the validity of the authentication header has been completed, the authentication header inspection unit 34 of the context-aware security controller 30 transmits the data reception request to a destination (that is, the cloud server 40) at step S20.

Thereafter, the cloud server 40 transmits predetermined packet data to the context-aware security controller 30 in response to the data reception request at step S22.

Based on the results of the inspection of the authentication header by the authentication header inspection unit 34, the packet data processing unit 36 of the context-aware security controller 30 transmits the original packet data transmitted by the cloud server 40 to the receiver agent unit 24 of the remote user terminal 20, blocks the transmission packet data and thus terminates a session between the receiver agent unit 24 and the server agent, or modulates the transmission packet data and thus makes the receiver agent unit 24 receive garbage data, not the original data at steps S24 and S26.

The apparatus, method and system for context-aware security control in a cloud environment according to some embodiments of the present invention have the advantage of controlling transmission data over a network based on various types of context information in a cloud service environment.

The apparatus, method and system for context-aware security control in a cloud environment according to some embodiments of the present invention have the advantage of independently performing the security control of transmission data without direct communication between a user terminal and a cloud server because a context-aware security controller, which is the agent of security control, is installed at the entrance of a cloud service network in in-line mode.

While the opportunity for analyzing a weak point, which enables security control to be avoided, is provided to a malicious attacker or an insider when the principal agent of security control functionality is an authentication server, the apparatus, method and system for context-aware security control in a cloud environment according to some embodiments of the present invention have the advantage of being more secure against hacking attacks because the context-aware security controller does not require the presence of an externally accessible IP address and passively performs security control in the section of a transmission network.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for context-aware security control in a cloud environment, the apparatus, communicated with one or more terminals and at least one server via a cloud network, comprising at least one computer processor, a communications interface, and a non-transitory computer-readable medium bearing algorithm arranged for causing the computer processor to perform:
    an authentication header inspector which generates an authentication header based on context information and a key transmitted from a first user terminal, and compares the generated authentication header with an authentication header of packet data received from a second user terminal; and
    a packet data processor, communicated between a cloud server and the first and the second user terminals via a cloud service network, configured at an entrance of the cloud service network based on in-line mode, and configured to selectively perform one of transmission, modulation and discarding of packet data transmitted from the cloud server in response to determination of the comparison of the generated authentication header with an authentication header of packet data received from the second user terminal transmitted to the cloud server,
    wherein the packet data processor performs modulation among transmission, modulation and discarding of the packet data, and the packet data processor modulates the packet data received from the cloud server and then transmits the modulated packet data to the second user terminal,
    wherein the generated authentication header and the authentication header of the packet data received from the second user terminal are generated using a hash-based message authentication code (HMAC) function, and
    wherein the context information of the user comprises location information, and the location information is provided in such a way that a single unique value is mapped to a specific Global Positioning System (GPS) range block.

2. The apparatus of claim 1, wherein the authentication header inspector restores the authentication header of the packet data received from the second user terminal by parsing a data reception request transmitted by the second user terminal, and inspects validity of the restored authentication header based on the generated authentication header.

3. The apparatus of claim 1, wherein the packet data processor performs transmission among transmission, modulation and discarding of the packet data, and the packet data processor transmits the original packet data received from the cloud server to the second user terminal without change.

4. The apparatus of claim 1, wherein the packet data processor performs discarding among transmission, modulation and discarding of the packet data, and the packet data processor blocks the packet data received from the cloud server, thereby terminating a session between the second user terminal and the cloud server.

5. The apparatus of claim 1, further comprising a policy input interface which provides an interface through which a type of context information and packet data processing policies of the packet data processor are input.

6. A computer-implemented method for context-aware security control in a cloud environment, comprising:
    receiving a key and context information transmitted from a first user terminal;
    generating, using coding comprising a hash-based message authentication code (HMAC) function, an authentication header based on the context information and key transmitted from the first user terminal;
    comparing the generated authentication header with an authentication header of packet data transmitted from a second user terminal; and
    selectively performing one of transmission, modulation and discarding of packet data received from a cloud server of a cloud service network in response to determination of the comparison of the generated authentication header with an authentication header of packet data received from the second user terminal transmitted to a cloud server,
    wherein the selectively performing one of transmission, modulation and discarding comprises, when the modulation is performed, modulating the packet data received from the cloud server and then transmitting the modulated packet data to the second user terminal, and
    wherein the context information of the user comprises location information, and the location information is provided in such a way that a single unique value is mapped to a specific Global Positioning System (GPS) range block.

7. The method of claim 6, further comprising:
    restoring the authentication header of the packet data received from the second user terminal by parsing a data reception request transmitted by the second user terminal; and
    inspecting validity of the restored authentication header based on the generated authentication header.

8. The method of claim 6, wherein the selectively performing one of transmission, modulation and discarding comprises transmitting the original packet data received from the cloud server to the second user terminal without change.

9. The method of claim 6, wherein the selectively performing one of transmission, modulation and discarding comprises, when the transmission is performed, transmitting the packet data received from the cloud server to the second user terminal without change.

10. The method of claim 6, wherein the selectively performing one of transmission, modulation and discarding comprises, when the discarding is performed, blocking the packet data received from the cloud server, thereby terminating a session between the second user terminal and the cloud server.

11. A system for context-aware security control in a cloud environment, comprising:
    a context information provision terminal which outputs context information including GPS value-based location information and a key;
    a remote user terminal which generates an authentication header based on context information and a key received from the context information provision terminal, and outputs a data reception request, along with the authentication header; and
    a context-aware security controller which receives the data reception request from the remote user terminal, and controls data transmission to the remote user terminal according to context-aware policies defined between the remote user terminal and a cloud server of a cloud service network, wherein the context-aware security controller generates an authentication header based on context information of a user and a key of the user received from a system administrator, compares the generated authentication header with an authentication header of packet data received from the remote user terminal, and outputs results of the comparison; and wherein the context-aware security controller performs one of transmission, modulation and discarding of packet data received from the cloud server based on the results of the comparison, wherein the context-aware security controller performs the modulation, and the context-aware security controller modulates the packet data received from the cloud server and then transmits the modulated packet data to the remote user terminal, wherein the authentication header generated by each of the remote user terminal and the context-aware security controller is generated using a hash-based message authentication code (HMAC) function, and wherein the location information is provided in such a way that a single unique value is mapped to a specific Global Positioning System (GPS) range block.

12. The system of claim 11,
wherein the remote user terminal receives the context information and the key from the context information provision terminal, and transmits the data reception request, together with the generated authentication header, to the context-aware security controller.

13. The system of claim 11,
wherein the context-aware security controller performs the transmission, and the context-aware security controller transmits the packet data received from the cloud server to the remote user terminal without change.

* * * * *